United States Patent [19]
Mori et al.

[11] Patent Number: 5,554,710
[45] Date of Patent: Sep. 10, 1996

[54] CONDUCTIVE POLYMERS AND PROCESS FOR PREPARING THE SAME

[75] Inventors: Shigeru Mori; Motoo Fukushima; Eiichi Tabei, all of Kawasaki; Yoshitaka Hamada; Seizi Katayama, both of Annaka, all of Japan

[73] Assignee: Shin-Etsu Chemical Co., Ltd., Tokyo, Japan

[21] Appl. No.: 197,986

[22] Filed: Feb. 17, 1994

[30] Foreign Application Priority Data

Feb. 18, 1993 [JP] Japan .................... 5-053043

[51] Int. Cl.⁶ .................... C08G 77/20; B05D 5/12; H01M 4/70
[52] U.S. Cl. .................... 528/32; 427/124; 427/109; 429/239; 429/252
[58] Field of Search .................... 427/124, 109; 429/239, 252; 528/32

[56] References Cited

U.S. PATENT DOCUMENTS

| | | | |
|---|---|---|---|
| 5,229,481 | 7/1993 | Tilley | 528/31 |
| 5,362,559 | 11/1994 | Hayase et al. | 428/333 |
| 5,438,113 | 8/1995 | Shimozawa et al. | 528/27 |

OTHER PUBLICATIONS

Brefort et al., "New Poly[(silylene)diacetylenes] and Poly[(germylene) diactylenes] . . . ", *Organometallics* 1992, 11, pp. 2500–2506.

Ohshita et al., "Preliminary communication Polymeric Organosilicon Systems VI. Synthesis and properties of trans-poly[(disilanylene)ethenylene]", *Journal of Organometallic Chemistry*, vol. 369 (1989), C18–C20, Elsevier Sequoia S.A., Lausanne—Printed in The Netherlands, JOM 9964PC.

Corriu et al., "Preliminary communication000 Electrical conductivity of FeCl₃-doped poly(alkynylsilane)s", *Journal of Organometallic Chemistry*, vol. 417 (1991, C50–C52, Elsevier Sequoia S.A., Lausanne, JOM 22124PC.

Ishikawa et al., "Polymeric Organosilicon Systems. 7. Ring-Opening Polymerization of 1,2,5,6-Tetrasilacycloocta-3,7-diynes", *Organometallics*, vol. 8 (1989), pp. 2741–1742.

Ohshita et al., "Polymeric Organosilicon Systems. 10. Synthesis and Conducting Properties of Poly[2,5-(disilanylene)thienylenes]", *Macromolecules*, vol. 24 (1991), pp. 2106–2107.

Nate et al., "Photolysis of Polymeric Organosilicon Systems. 4. Photochemical Behavior of Poly[p–disilanylene)phenylene]" *Organometallics*, vol. 6 (1987), pp. 1673–1679.

Primary Examiner—John C. Bleutge
Assistant Examiner—Karen A. Dean
Attorney, Agent, or Firm—Millen, White, Zelano, & Branigan, P.C.

[57] ABSTRACT

A conductive polymer comprises a silicon-containing polymer having, in the main chain thereof, Si—Si bonds or both Si—Si bonds and C—C multiple bonds, and ferric chloride doped in said polymer through vapor phase doping. A method for preparing such a conductive polymer is also described.

7 Claims, No Drawings

CONDUCTIVE POLYMERS AND PROCESS FOR PREPARING THE SAME

BACKGROUND OF THE INVENTION

1. Field of the Invention

This invention relates to conductive polymers comprising silicon-containing polymers, such as polysilanes, poly(disilanylenephenylenes) and the like, which are particularly useful as electrodes for batteries, solar cells and boxes for electromagnetic shields. The invention also relates to a process for preparing such polymers.

2. Description of the Prior Art

In recent years, it has been found that doping of polyacetylene with electron acceptors or electron donors results in a charge transfer forming reaction, thereby developing high electric conductivity based on the electron conduction. Attention has now been paid to conductive organic polymer compounds such as polyacetylene, polyphenylene, polypyrrole, polyaniline and polythiophene for use as materials capable of forming highly conductive films.

However, these organic polymer compounds are not molten or fused and are poor in shaping properties. Accordingly, the following problems are involved. Where these polymers are formed into films according to a vapor phase polymerization process or an electrolytic polymerization process, limitation is inevitably placed on the shape of the resultant film, which depends on the shape of a reactor container or an electrode. In addition, when doped with electron acceptors or electron donors, the polymers suffer considerable degradation, thus presenting problems with practical applications.

On the other hand, silicon-containing polymers contain silicon atoms, so that they are more metallic in nature and exhibit greater non-electron-localizing properties than those polymers containing carbon atoms. In addition, such polymers are highly resistant to heat, are flexible and have good thin film-forming properties, thus being very interesting polymers. However, few silicon-containing polymers have been known as having high conductivity. Only Ishikawa et al proposed highly conductive polymers wherein disilanylenephenylene polymers are doped with fluorine compounds such as $SbF_5$, $AsF_5$ and the like (M. Ishikawa et al., J. Organometallics, 6, 1673 (1987); J. Organomet. Chem., 369, C18 (1989); Organometallics, 8, 2741 (1989); Macromolecules, 24, 2106 (1991)). However, $SbF_5$, $AsF_5$ and the like are so toxic that they are undesirable to handle. Further, they necessitate a complicated doping procedure.

Therefore, studies have been made to dope ferric chloride ($FeCl_3$) which is less toxic and easier in handling than the fluorine compounds such as $SbF_5$, $AsF_5$ and the like. For instance, Corriu et al proposed doping with $FeCl_3$ by mixing the polymer and $FeCl_3$ in a solution (R. J. Corriu et al., J. Organomet. Chem., 417, C50 (1991)). This procedure is a wet doping method which requires flammable solvents and has the problem that satisfactorily high electric conductivity cannot be imparted to the polymers.

SUMMARY OF THE INVENTION

An object of the present invention is to provide silicon-containing polymers which are imparted with high electric conductivity and good shaping properties.

Another object of the present invention is to provide silicon-containing polymers doped with ferric chloride whereby high electric conductivity is imparted thereto.

A further object of the present invention is to provide a method for preparing such silicon-containing polymers as mentioned above.

We have made intensive studies in order to achieve the above objectives. As a result, it has been found that silicon-containing polymers having Si—Si bonds or both Si—Si bonds and C—C multiple bonds in the main chain thereof are simply doped by a dry process wherein they are exposed to the vapor of ferric chloride, thereby obtaining conductive polymers having high electric conductivity and good shaping properties. More particularly, ferric chloride is initially heated and vaporized at normal pressures or under reduced pressure. When the film of a silicon-containing polymer is subjected to vapor phase doping of ferric chloride, it is readily doped thereby providing a conductive polymer film with high electric conductivity. The silicon-containing polymers having such a main chain as set out above are soluble in solvents and can be formed as a film or coating of a desired shape. This enables one to dope the polymer in the form of a desirably shaped film or coating. Ferric chloride used for the doping is low in toxicity and inexpensive, and it readily imparts electric conductivity to silicon-containing polymers at a high level. After doping, the polymers undergo little or no embrittlement and keep their inherent flexibility.

Hence, according to one embodiment of the present invention, there is provided a silicon-containing conductive polymer which comprises a silicon-containing polymer having Si—Si bonds or both Si—Si bonds and C—C multiple bonds in the main chain, and ferric chloride doped in the silicon-containing polymer through vapor phase doping.

According to another embodiment of the present invention, there is also provided a method for preparing a silicon-containing conductive polymer which comprises providing a film or coating of a silicon-containing polymer which has Si—Si bonds or both Si—Si bonds and C—C multiple bonds in the main chain, and subjecting the film or coating to vapor phase doping with ferric chloride. In order to create the vapor of ferric chloride, it is preferred to heat ferric chloride at normal pressures or under a reduced pressure at a temperature of 50° to 300° C.

In general, ferric chloride may be doped in silicon-containing polymers by several methods including (1) a wet doping method wherein the polymer is immersed in a solution of dissolved ferric chloride in an inert solvent, and (2) a simultaneous doping method wherein the polymer is dissolved in a solution of dissolved ferric chloride, from which a film or coating is formed thereby doping the polymer with the ferric chloride at the same time. In either doping method, the doping with ferric chloride brings about degradation of the silicon-containing polymer. This will entail gelation or decomposition of the polymer in a complicated manner. Additionally, high electric conductivity cannot be achieved. In contrast, the method of the present invention is free of these disadvantages, by which the polymers can be readily doped thereby attaining high electric conductivity.

The conductive polymers have good shaping properties and can be readily formed into highly conductive films or coatings. The condutive polymers are useful as a material for forming electrodes of batteries, solar cells and boxes for electromagnetic shields. Thus, the polymers have wide utility in the fields of the electric, electronic and communication industries.

DETAILED DESCRIPTION OF THE INVENTION

The silicon-containing polymers should be ones which have Si—Si bonds or both Si—Si bonds and C—C multiple bonds in the main chain. The silicon-containing polymer should preferably have the following general formula (1) or (2).

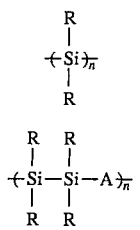

wherein A is a group with multiple C—C bonds.

Examples of the group with multiple C—C bonds include

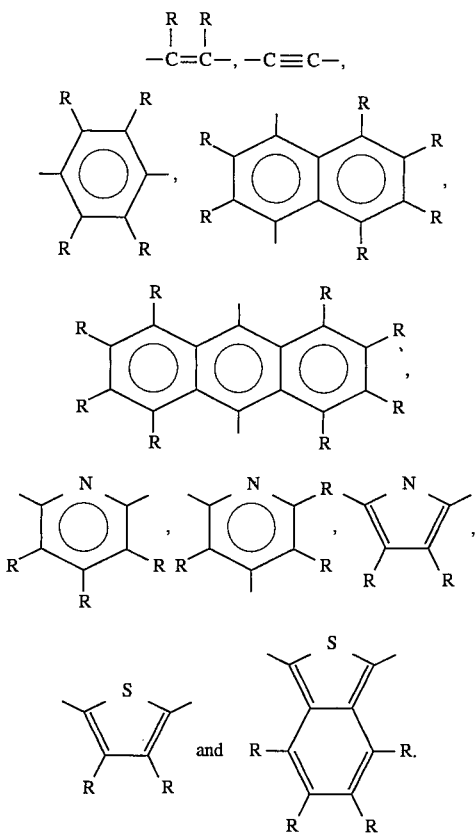

In the above formulae, each R independently represents a hydrogen atom or a substituted or unsubstituted monovalent organic group having 1 to 14, preferably 1 to 10 carbon atoms. Specific examples of the monovalent organic group include alkyl groups such as methyl, ethyl, propyl, butyl, hexyl and the like, aryl groups such as phenyl, tolyl, naphthyl, anthracenyl and the like, and heterocyclic ring-bearing alkyl groups such as carbazolylpropyl.

These silicon-containing polymers are not critical with respect to the weight average molecular weight and are generally in the range of 2,000 to 1,000,000, preferably 3,000 to 500,000. Therefore, "n" in formulae (1) and (2) should preferably be an integer which imparts the above weight average molecular weight to the silicon-containing polymers. In the silicon-containing polymer, the Si—Si bond should be provided in an amount of 50 to 100 mol %.

In order to obtain the conductive polymer of the invention, ferric chloride is heated at normal pressures or under a reduced pressure to vaporize the ferric chloride. The silicon-containing polymer is subjected to vapor phase doping in the vapor of the ferric chloride. As the vapor phase doping proceeds, the conductivity of the polymer increases rapidly. Finally, the conductivity is maintained at a given level, at which time the doping is completed.

The doping speed can be appropriately controlled by controlling the atmospheric temperature of the ferric chloride dopant and the partial pressure of the dopant in a container used for the doping. More particularly, the pressure is in the range of 0.001 to 760 mmHg and the temperature is in the range of 50° to 300° C. In view of the effective increase of the electric conductivity of the polymer, it is preferred that the pressure is in the range of 0.1 to 10 mmHg and the temperature is in the range of 50° to 200° C.

If the pressure is lower than 0.001 mmHg, it takes a long time before reaching such a low pressure level, with poor economy. On the contrary, when the pressure exceeds 760 mmHg, the doping speed becomes very slow. This is because the boiling point of ferric chloride is 319° C. at normal pressures. When the temperature is lower than 50° C., the doping speed becomes low. When the temperature exceeds 300° C., the silicon-containing polymer film may degrade at the time of the doping.

Using the doping method of the invention, there can be obtained conductive polymers with high electric conductivity by a simple procedure wherein ferric chloride which is low in toxicity is used as a dopant without use of any flammable solvent.

It will be noted that in the practice of the invention, the starting silicon-containing polymer is usually employed in the form of a film or coating in order to facilitate uniform doping throughout the polymer.

The present invention is more particularly described by way of examples, which should not be construed as limiting the invention thereto. Comparative examples are also described. First, preparation of polysilane and poly(di-silanylenephenylene) is described.

SYNTHETIC EXAMPLE

Toluene was added to metallic sodium in a stream of nitrogen, followed by heating to 110° C. for dispersion under high speed agitation. While agitating, dichlorodiorganosilane or bis(chlorodialkylsilyl)benzene was gently dropped into the dispersion. The silicon compounds were each added in an amount of 1 to 1.05 moles per 2 moles of the metallic sodium. Agitation was continued over 4 hours until the starting material disappeared, thereby completing the reaction. After allowing to cool, the resulting salt was filtered and concentrated to obtain intended polysilane or poly (disilanylenephenylene).

EXAMPLES 1–11

The silicon-containing polymer (i.e. polysilane or poly-(disilanylenephenylene) prepared in the Synthetic Example) was dissolved in tetrahydrofuran (THF) to make a 10% polymer solution. Separately, a four terminal unit was formed on a glass sheet by vacuum deposition of platinum to provide an electrode. The polymer solution was spin coated on the glass sheet and dried at a pressure of 2 mmHg at a temperature of 50° C., thereby forming a 1 μm thick thin film to obtain a sample for measurement of electric conductivity.

Ferric chloride was placed in the bottom of a dried, brown glass bottle container and the thin film was attached to the inside of the glass bottle. Thereafter, the glass bottle was connected to a vacuum pump and evacuated to a level of 4 mmHg, under which the ferric chloride at the bottom of the bottle was heated by means of a mantle heater. By the heating, the thin film was turned from transparent to blackish brown, simultaneously with a rapid increase of the electric conductivity. The conductivity was finally kept at a given level, at which the temperature of the sample reached as high as 150° C. At this stage, the vacuum pump was stopped and the heating was also stopped, followed by allowing the bottle to cool down to 25° C. and measurement of electric conductivity. The results are shown in Table 1.

It will be noted that the conductivity was measured by contacting the film on the glass sheet with the vapor of ferric chloride while monitoring the variation in DC resistance in relation to the time. After the resistance value was kept stable, the film was allowed to cool down to 25° C. The electric conductivity was determined from the resistance value.

TABLE 1

| Example No. | Silicon-containing Polymer [weight average molecular weight] | conductivity after doping with FeCl$_3$ (S/cm, at 25° C.) |
| --- | --- | --- |
| 1 | phenylmethylpolysilane [46,000] | $5.5 \times 10^{-6}$ |
| 2 | SiH group-containing phenylmethylpolysilane (containing 6.5 mol % of SiH group) [24,000] | $1.6 \times 10^{-4}$ |
| 3 | dioctylpolysilane [120,000] | $1.0 \times 10^{-7}$ |
| 4 | dibutylpolysilane [650,000] | $2.2 \times 10^{-10}$ |
| 5 | (biphenylethyl)methylpolysilane [8,500] | $1.3 \times 10^{-4}$ |
| 6 | CZ [3,600] | $1.5 \times 10^{-5}$ |
| 7 | CZ/PS copolymer* (containing 16.7 mol % of carbazolylpropyl group) [207,000] | $2.6 \times 10^{-5}$ |
| 8 | (phenanthrenylpropyl)methyl-polysilane [8,600] | $7.7 \times 10^{-6}$ |
| 9 | phenylmethyl side chain-bearing polydisilanylenephenylene [27,000] | $3.3 \times 10^{-4}$ |
| 10 | dibutyl side chain-bearing polydisilanylenephenylene [9,500] | $1.5 \times 10^{-6}$ |
| 11 | phenylmethyl side chain-bearing polydisilanylenexylylene [6,900] | $5.0 \times 10^{-4}$ |

*CZ: 3-(N-carbazoyl) propyl methyl polysilane
PS: phenylmethylpolysilane

COMPARATIVE EXAMPLES 1 & 2

Polysilane having a carbazolylisopropyl group at side chains (CZ) was provided as a silicon-containing polymer and dissolved in THF to make a 10% polymer solution. Separately, a 10% ferric chloride solution in THF was mixed with the polymer solution at ratios to the polymer indicated in Table 2, followed by allowing to stand. As a result, it was found that about one hour after the mixing, the mixtures were gelled.

A four terminal unit was formed on a glass substrate to provide an electrode. Immediately after mixing of the 10% ferric chloride solution in THF and the 10% polymer solution in THF, the mixture was spin coated onto the glass sheet and dried under conditions of a pressure of 2 mmHg and a temperature of 50° C., thereby forming a 1.0 μm thick thin film for use as a sample for measurement of electric conductivity (Comparative Examples 1 and 2). The results of the measurement are shown in Table 2 in which the results of Example 6 are also shown for comparison.

TABLE 2

| | Film-forming conditions | Amount of dopant (ratio by weight) | Electric conductivity (S/cm at 25° C.) |
| --- | --- | --- | --- |
| Comparative Example 1 | wet process solvent: THF temperature: 25° C. pressure: 760 mmHg | CZ/FeCl$_3$ = 1/0.333 | $3.8 \times 10^{-8}$ |
| Comparative Example 2 | | CZ/FeCl$_3$ = 1/0.666 | $4.7 \times 10^{-8}$ |
| Example 6 | dry process temperature: 150° C. pressure: 2 mmHg | — | $1.5 \times 10^{-5}$ |

What is claimed is:

1. A method for preparing a silicon-containing conductive polymer which comprises providing a film or coating of a silicon-containing polymer which has Si—Si bonds or both Si—Si bonds and multiple C—C bonds in the main chain, and subjecting the film or coating to vapor phase doping with ferric chloride.

2. A method according to claim 1, wherein the vapor phase doping is effected under conditions of a pressure of from 0.001 to 760 mmHg and a temperature of from 50° to 300° C.

3. A method according to claim 2, wherein said pressure is from 0.1 to 10 mmHg and said temperature is from 50° to 200° C.

4. A method according to claim 1, wherein said silicon-containing polymer has the following formula (1) or (2):

  (1)

  (2)

wherein each R independently represents a hydrogen atom or a substituted or unsubstituted monovalent hydrocarbon group, A represents a group with multiple C—C bonds and n is a number such that the weight average molecular weight of the polymer is 2,000 to 1,000,000.

5. A method according to claim 4, wherein said group with multiple C—C bonds is selected from the group consisting of

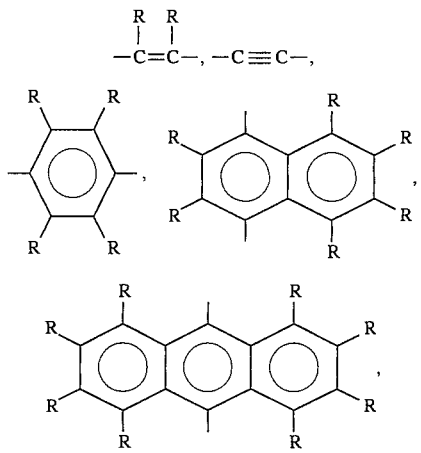

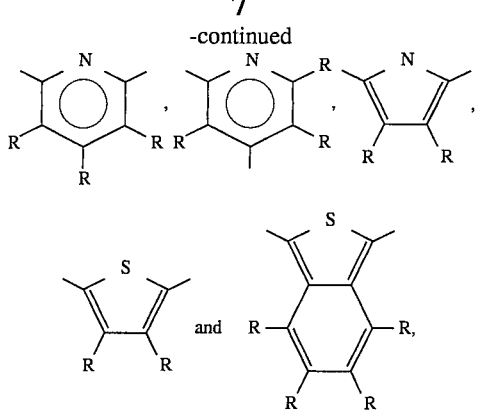

wherein each R independently is a hydrogen atom or a monovalent alkyl, aryl or carbazolyl propyl group of 1 to 14 carbon atoms.

6. A method according to claim 1, wherein said silicon-containing polymer has a weight average molecular weight of from 2,000 to 1,000,000.

7. The method of claim 1, wherein the silicon-containing polymer contains Si—Si bonds in amount of 50 to 100 mol % in relation to the total of Si—Si bonds and C—C bonds.

* * * * *